(12) United States Patent
Hamilton, II et al.

(10) Patent No.: US 9,094,393 B2
(45) Date of Patent: *Jul. 28, 2015

(54) AUTHENTICATION BASED ON PREVIOUS AUTHENTICATIONS

(71) Applicant: International Business Machines Corporation, Armonk, NY (US)

(72) Inventors: Rick A. Hamilton, II, Charlottesville, VA (US); Brian M. O'Connell, Cary, NC (US); John R. Pavesi, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,392

(22) Filed: Nov. 11, 2013

(65) Prior Publication Data

US 2014/0068730 A1 Mar. 6, 2014

Related U.S. Application Data

(63) Continuation of application No. 11/741,516, filed on Apr. 27, 2007, now Pat. No. 8,726,347.

(51) Int. Cl.
| | |
|---|---|
| *G06F 17/30* | (2006.01) |
| *H04L 29/06* | (2006.01) |
| *G06F 21/41* | (2013.01) |

(52) U.S. Cl.
CPC ............. *H04L 63/08* (2013.01); *G06F 21/41* (2013.01); *H04L 63/105* (2013.01); *H04L 63/20* (2013.01); *H04L 63/205* (2013.01)

(58) Field of Classification Search
CPC ....................................... H04L 63/08
See application file for complete search history.

(56) References Cited

U.S. PATENT DOCUMENTS

| | | | |
|---|---|---|---|
| 6,161,182 | A | 12/2000 | Nadooshan |
| 6,219,790 | B1 | 4/2001 | Lloyd et al. |

(Continued)

FOREIGN PATENT DOCUMENTS

| | | |
|---|---|---|
| JP | 11355267 A | 12/1999 |
| JP | 2000259567 A | 9/2000 |

(Continued)

OTHER PUBLICATIONS

Takeda Kazutsugu, "User authentication System," 1999, JP, 11-355267, JP machine translation, pp. 1-7.*

(Continued)

*Primary Examiner* — Luu Pham
*Assistant Examiner* — Canh Le
(74) *Attorney, Agent, or Firm* — Schmeiser, Olsen & Watts, LLP; Mark C. Vallone

(57) ABSTRACT

A method and system for authenticating a user to a target server. A request is received from a user computer system to authenticate the user for access to a target server at level N of N levels (N≥2). Each record of a stored authentication plan associated with the user has authentication records each having expected information relating to authentication of the user for access to the N−1 target servers at respective levels 1 through N−1. Each record of a received current authentication plan for the user has authentication records each having current information relating to authentication of the user for access to the N−1 target servers at respective levels 1 through N−1. It is determined that that there is at least a partial match between the stored and current authentication plans, and in response, the user is authenticated for access to the target server at level N.

20 Claims, 6 Drawing Sheets

(56) References Cited

U.S. PATENT DOCUMENTS

| | | | |
|---|---|---|---|
| 6,584,505 | B1 | 6/2003 | Howard et al. |
| 6,651,096 | B1 | 11/2003 | Gai et al. |
| 6,754,820 | B1 | 6/2004 | Scheidt et al. |
| 7,039,812 | B2 | 5/2006 | Kawan et al. |
| 7,054,944 | B2 | 5/2006 | Tang et al. |
| 7,082,532 | B1 | 7/2006 | Vick et al. |
| 7,085,934 | B1 | 8/2006 | Edwards |
| 7,162,649 | B1 | 1/2007 | Ide et al. |
| 7,546,629 | B2 | 6/2009 | Albert et al. |
| 7,603,472 | B2 | 10/2009 | Petry et al. |
| 7,634,800 | B2 | 12/2009 | Ide et al. |
| 8,201,180 | B2 | 6/2012 | Briscoe et al. |
| 8,237,430 | B2 | 8/2012 | Thode et al. |
| 8,272,041 | B2 | 9/2012 | Hamilton et al. |
| 8,272,043 | B2 | 9/2012 | Hamilton et al. |
| 8,713,665 | B2 | 4/2014 | Hamilton, II et al. |
| 8,726,347 | B2 | 5/2014 | Hamilton, II et al. |
| 2002/0002688 | A1 | 1/2002 | Gregg et al. |
| 2002/0112155 | A1 | 8/2002 | Martherus et al. |
| 2002/0133719 | A1 | 9/2002 | Westerdal |
| 2003/0055962 | A1 | 3/2003 | Freund et al. |
| 2003/0177389 | A1 | 9/2003 | Albert et al. |
| 2004/0078591 | A1 | 4/2004 | Teixeira et al. |
| 2004/0103317 | A1 | 5/2004 | Burns |
| 2004/0128393 | A1 | 7/2004 | Blakley et al. |
| 2004/0187029 | A1 | 9/2004 | Ting |
| 2005/0055578 | A1 | 3/2005 | Wright et al. |
| 2005/0102244 | A1 | 5/2005 | Dickinson |
| 2005/0177869 | A1 | 8/2005 | Savage et al. |
| 2006/0005254 | A1 | 1/2006 | Ross |
| 2006/0155681 | A1 | 7/2006 | Chiang et al. |
| 2006/0265412 | A1 | 11/2006 | Griffiths et al. |
| 2007/0033643 | A1* | 2/2007 | Rossi et al. ............... 726/10 |
| 2007/0150553 | A1 | 6/2007 | Fields et al. |
| 2007/0172808 | A1 | 7/2007 | Capone |
| 2008/0019352 | A1 | 1/2008 | Bennett |
| 2008/0178260 | A1 | 7/2008 | Schwarz et al. |
| 2008/0320580 | A1 | 12/2008 | Hamilton et al. |
| 2008/0320581 | A1 | 12/2008 | Hamilton et al. |
| 2008/0320584 | A1 | 12/2008 | Hamilton et al. |
| 2012/0331541 | A1 | 12/2012 | Hamilton et al. |

FOREIGN PATENT DOCUMENTS

| | | |
|---|---|---|
| JP | 2002183089 A | 6/2002 |
| JP | 2004206258 A | 7/2004 |
| JP | 2006035631 A | 2/2006 |
| WO | WO0237728 | 5/2002 |
| WO | 2004034672 | 2/2004 |

OTHER PUBLICATIONS

Roberto Tamassia et al., Role-Based Cascaded Delegation, SACMAT'04, Jun. 2-2, 2004, pp. 146-155.*

M. Zviran and W. J. Haga, A comparison of Password Techniques for Multilevel Authentication Mechanisms, The Computer Journal, vol. 36, No. 3, 1993, pp. 227-237.*

Karen R. Sollins, Cascaded Authentication, IEEE, 1988, pp. 156-163.*

Office Action Mail Date May 13, 2010 for U.S. Appl. No. 11/766,165.

Notice of Allowance Mail Date Jun. 8, 2012 for U.S. Appl. No. 11/765,004.

Office Action Mail Date Apr. 29, 2010 for U.S. Appl. No. 11/765,004.

Office Action Mail Date Aug. 19, 2013 for U.S. Appl. No. 13/602,362.

Notice of Allowance Mail Date Dec. 11, 2013 for U.S. Appl. No. 13/602,362.

Notice of Allowance for U.S. Appl. No. 11/741,516, filed Apr. 27, 2007.

Li Gong, A Secure Identity-Basd Capability System, IEEE, 1989, pp. 56-63.

Notice of Allowance (Mail Date May 9, 2012) for U.S. Appl. No. 11/766,165, filed Jun. 21, 2007.

Notice of Allowance (Mail Date May 11, 2012) for U.S. Appl. No. 11/766,146, filed Jun. 21, 2007.

Amendment filed May 31, 2012 in response to Final Office Action (Mail Date Apr. 16, 2012) for U.S. Appl. No. 11/765,004, filed Jun. 19, 2007.

Amendment filed Apr. 24, 2012 in response to Office Action (Mail Date Feb. 1, 2012) for U.S. Appl. No. 11/766,165, filed Jun. 21, 2007.

Amendment filed Apr. 9, 2012 in response to Office Action (Mail Date Jan. 11, 2012) for U.S. Appl. No. 11/765,004, filed Jun. 19, 2007.

Amendment filed Apr. 24, 2012 in response to Office Action (Mail Date Feb. 1, 2012) for U.S. Appl. No. 11/766,146, filed Jun. 21, 2007.

Final Office Action (Mail Date Apr. 16, 2012) for U.S. Appl. No. 11/765,004, filed Jun. 19, 2007.

International Search Report including transmittal with PCT Written Opinion of International Searching Authority, From the International Searching Authority, mailed May 20, 2009; Applicant: International Business Machines Corporation, International Application No. PCT/EP2008/056192; 9 pages.

Office Action (Mail Date Jan. 11, 2012) for U.S. Appl. No. 11/765,004, filed Jun. 19, 2007.

Office Action (Mail Date Feb. 1, 2012) for U.S Appl. No. 11/766,146, filed Jun. 21, 2007.

Office Action (Mail Date Feb. 1, 2012) for U.S. Appl. No. 11/766,165, filed Jun. 21, 2007.

Date of JPO Office action Mar. 5, 2013.

Notice of Allowance (Mail Date Oct. 7, 2013) for U.S. Appl. No. 11/741,516, filed Apr. 27, 2007, First Named Inventor Rick A. Hamilton, II.

Restriction Requirement (Mail Date Aug. 4, 2010) for U.S. Appl. No. 11/741,516, filed Apr. 27, 2007, First Named Inventor Rick A. Hamilton, II.

Response (Aug. 5, 2010) for U.S. Appl. No. 11/741,516, filed Apr. 27, 2007, First Named Inventor Rick A. Hamilton, II.

Office Action (Mail Date Sep. 27, 2010) for U.S. Appl. No. 11/741,516, filed Apr. 27, 2007, First Named Inventor Rick A. Hamilton, II.

Response (Feb. 23, 2011) for U.S. Appl. No. 11/741,516, filed Apr. 27, 2007, First Named Inventor Rick A. Hamilton, II.

Final Office Action (Mail Date May 11, 2011) for U.S. Appl. No. 11/741,516, filed Apr. 27, 2007, First Named Inventor Rick A. Hamilton, II.

RCE (Aug. 9, 2011) for U.S. Appl. No. 11/741,516, filed Apr. 27, 2007, First Named Inventor Rick A. Hamilton, II.

International Search Report including transmittal with PCT Written Opinion of International Searching Authority, From the International Searching Authority, mailed Nov. 5, 2008; Applicant: International Business Machines Corporation, International Application No. PCT/EP2008/057937; 10 pages.

International Search Report including transmittal with PCT Written Opinion of International Searching Authority, From the International Searching Authority, mailed Feb. 23, 2009; Applicant: International Business Machines Corporation, International Application No. PCT/EP2008/057938; 9 pages.

International Search Report including transmittal with PCT Written Opinion of International Searching Authority, From the International Searching Authority, mailed Jul. 18, 2008; Applicant: International Business Machines Corporation, International Application No. PCT/EP2008/054412; 13 pages.

Haffner, Ernst-Georg, et al., "Managing Distributed Personal Firewalls with Smart Data Servers," World Conference on WWW and Internet [Online]2001, Retrieved from the Internet: URL: http:/wiki.uni.lu/secan-lab/Haffner2001.pdf; 6 pages.

Summons to attend oral proceedings pursuant to Rule 115(1) EPC, dated Feb. 11, 2015, Reference AUS920070081EP1, Application No. 08736124.2—1853/2150916, 8 pages.

Patent application for U.S. Appl. No. 14/706,044, filed May 7, 2015, Conf. No. 5121.

* cited by examiner

AUTHENTICATION BASED ON PREVIOUS AUTHENTICATIONS

This application is a continuation application claiming priority to Ser. No. 11/741,516, filed Apr. 27, 2007, now U.S. Pat. No. 8,726,347 issued May 13, 2014.

FIELD OF INVENTION

The present invention is in the field of data processing systems and, in particular, to systems, methods and media for implementing a cascading authentication system for authenticating users to a server based on previous authentications to other servers by the user.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings.

Many organizations utilize server computer systems for more complicated tasks such as providing e-commerce websites, providing complex multi-user applications, maintaining large databases, or performing other resource-intensive tasks. Organizations with significant computing needs often have many servers performing a wide variety of tasks with the servers communicating with each other via a network such as a local area network (LAN). In these systems, individual users may interact with the servers to access various system resources, such as applications, databases, or other resources, so that the systems resources may be shared by multiple users.

Users often arrive at their target server (i.e., the software server to which they desire to gain access) by successfully navigating authentications at multiple levels. A user, for example, desiring to access a target server which is a database may have to first authenticate to their computer's operating system, next authenticate to a Virtual Private Network (VPN) from the Internet to access a corporate network, then authenticate to a firewall to access a lab, and lastly authentication with the database residing on a machine in the lab. Other authentication steps are possible, such as establishing a remote control session to login to a remote machine, a remote shell session such as with SSH or Telnet, or other steps.

Such a system of cascading authentications, however, can result in security risks if a hacker can "skip" layers and begin their authentication attempt from as few layers from the target server as possible. If someone desires to masquerade as a particular user, for example, it is much easier to guess or obtain one set of credentials rather than multiple sets (assuming different credentials at each layer). It is accordingly typically easier to gain unauthorized access as an "insider" in part because there are fewer layers. In an illustrative example, a system with four layers of authentication can be assumed: an outer wall with a 95% chance of stopping a hacker, an inner firewall with a 93% chance, a secure system with a 90% chance, and application-level authentication with an 85% chance. The cumulative probability of making all the way from the outside to the application is one minus the chance of getting stopped at each point, cascaded through the system, resulting in a probability of (0.05)(0.07)(0.10)(0.15)= 0.0000525. In contrast, an insider in this example with direct access to the application would have a 15% chance (0.15) of penetrating the application as they avoid the previous levels of authentication.

System designers have attempted to solve the problem of hackers skipping levels of authentication by emulating an insider. One known solution is to allow authentication only from a defined IP or MAC address to limit access to the specified address. This solution, however, is often not practical, particularly when a VPN is involved. Moreover, this solution is insufficient when the authorized machine is shared, does not take full advantage of all of the authentication layers, and can be easily spoofed. Another known solution is to require additional authentication, such as a smart card or other device. This solution, however, requires significant infrastructure costs and adds to user inconvenience. Both of these problems are exacerbated if the user has to be authenticating multiple layers as a separate smart card would typically be required for each of the multiple layers.

SUMMARY OF THE INVENTION

The problems identified above are in large part addressed by systems, methods and media for authenticating a user to a server based on previous authentications to other servers. Embodiments of a method for authenticating a user to a server may include receiving a request to authenticate the user to the server and determining whether authenticating the user requires matching an authentication plan. If a plan is required, the method may also include accessing a stored authentication plan with authentication records each having expected information relating to user access to a different, particular server at a previous layer of authentication than the target server. The method may also include receiving an indication of the user's current authentication plan from an authentication store where the plan has authorization records each having current information relating to user access to a particular, different server at a previous layer of authentication than the target server. Embodiments of the method may also include comparing the stored authentication plan with the received current authentication plan to determine whether they match and, in response to a match, authenticating the user.

Another embodiment provides a computer program product comprising a computer-useable medium having a computer readable program wherein the computer readable program, when executed on a computer, causes the computer to perform a series of operations for authenticating a user to a server. The series of operations generally includes receiving a request to authenticate the user to the server and determining whether authenticating the user requires matching an authentication plan. If a plan is required, the series of operations may also include accessing a stored authentication plan with authentication records each having expected information relating to user access to a different, particular server at a previous layer of authentication than the target server. Embodiments of the series of operations may also include receiving an indication of the user's current authentication plan from an authentication store where the plan has authorization records each having current information relating to user access to a particular, different server at a previous layer of authentication than the target server. Embodiments of the series of operations may also include comparing the stored authentication plan with the received current authentication plan to determine whether they match and, in response to a match, authenticating the user.

A further embodiment provides a cascading authentication system. The cascading authentication system may include a target server having an authentication plan manager to access a stored authentication plan associated with a user requesting access to the target server, where the stored authentication plan includes one or more authentication records each having expected information relating to access by a user to a different, particular server at a previous layer of authentication than the target server. The cascading authentication system may also include an authentication store to store a current authentication plan associated with the user, where the current authentication plan includes one or more authentication records each having current information relating to access by a user to a different, particular server at a previous layer of authentication than the target server. Embodiments of the cascading authentication system may also include an authentication store manager to provide the current authentication plan associated with a particular user to the authentication plan manager of the target server, where the authentication plan manager of the target server determines whether to authenticate a user based on a comparison between the stored authentication plan for the user and the current authentication plan for the user.

Another embodiment provides a method for authenticating a user to a target server. Embodiments of the method may include performing an authentication step for one or more servers at a previous layer of authentication to the target server and storing an authentication event record for each performed authentication step in an authentication store. Embodiments of the method may also include attempting to authenticate to the target server, where the target server requires an authentication plan associated with the user. Embodiments of the method may also include receiving an indication of whether access to the target server was granted.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
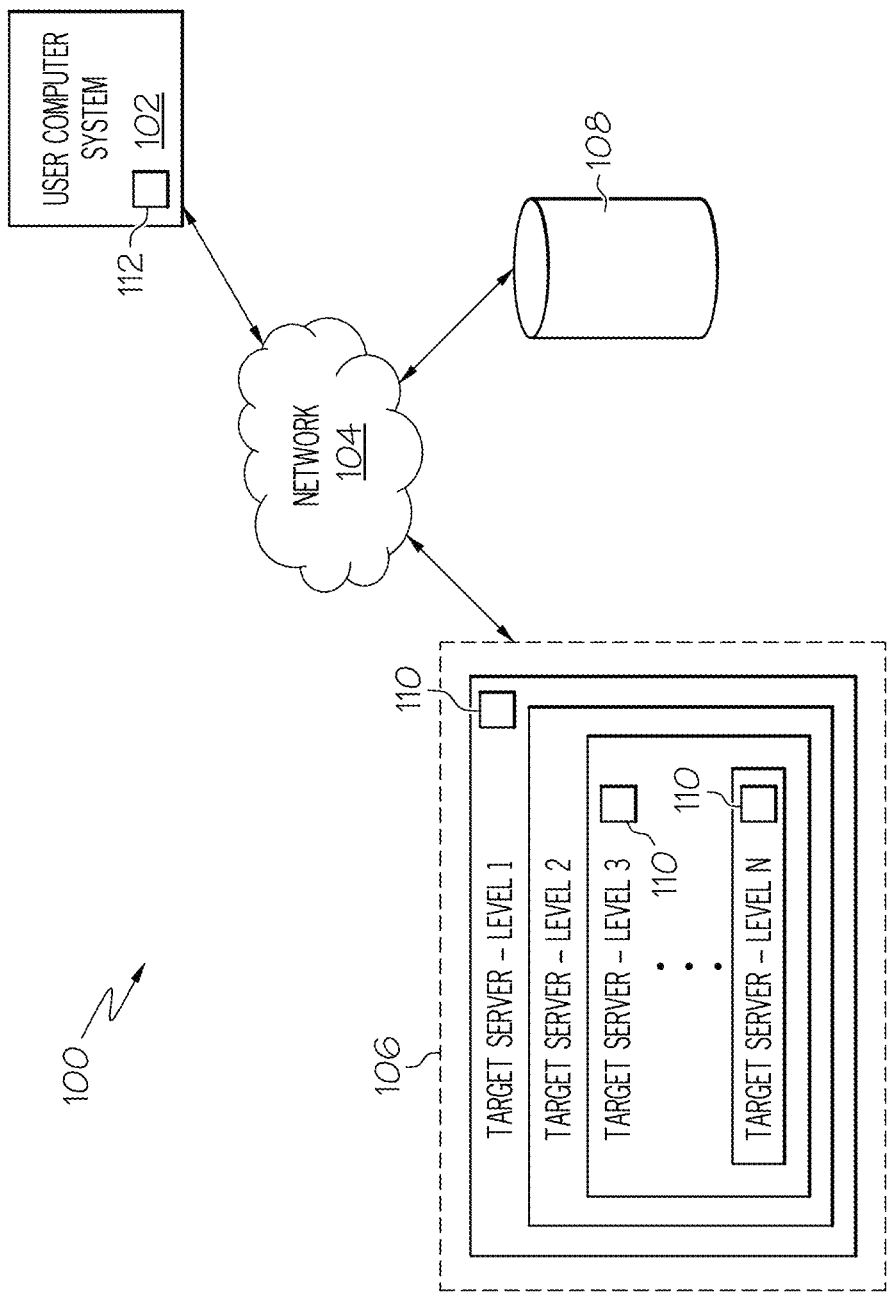
FIG. 1 depicts an environment for a cascading authentication system with a user computer system, a plurality of target servers, and an authentication store according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for authenticating a user to a server based on previous authentications to other servers are disclosed. Embodiments of a method for authenticating a user to a server may include receiving a request to authenticate the user to the server and determining whether authenticating the user requires matching an authentication plan. If a plan is required, the method may also include accessing a stored authentication plan with authentication records each having expected information relating to user access to a different, particular server at a previous layer of authentication than the target server. The method may also include receiving an indication of the user's current authentication plan from an authentication store where the plan has authorization records each having current information relating to user access to a different server, particular server at a previous layer of authentication than the target server. Embodiments of the method may also include comparing the stored authentication plan with the received current authentication plan to determine whether they match and, in response to a match, authenticating the user.

The system and methodology of the disclosed embodiments allows for effective and efficient authentication of a user to a target server by relying on other, previously-made authentications to other servers. Target servers according to the disclosed embodiments are given the ability to check for and require previous layers of authentication according to a pre-established authentication plan before authenticating a user. This solution assists in preventing hackers or others from bypassing earlier layers of authentication, such as by posing as an 'insider', increasing the overall security of the target server. The inside layers of a tiered authorization system may thus be made more secure than previous systems as the inside layers may more directly benefit from authorization schemes of previous layers. In cases where business or user-specified rules dictate that a user must go through multiple defined layers of authentication, the disclosed system and methodology may enhance security, particularly from insiders.

In general, the routines executed to implement the embodiments of the invention, may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a cascading authentication system with a user computer system, a plurality of target servers, and an authentication store according to some embodiments. In the depicted embodiment, the cascading authentication system 100 includes a user computer system 102 and a plurality of target servers 106 in communication via network 104. Target servers 106, as will be described subsequently, are servers in the software sense rather than in the machine classification sense and thus may be considered a software entity (e.g., application, operating system, network interface, etc.) for which authentication may be required for access. The user computer system 102 and/or target servers 106 may also be in communication with an authentication store 108 via network 104.

A user of the user computer system 102 may desire to access a particular target server 106 that is one or more layers down in a series of target servers 106, such as a database target server 106 protected by a firewall target server 106 and an operating system authentication protocol. As will be described in more detail subsequently, the disclosed system may advantageously require information about authentications at lower levels of target server 106 before providing authentication to a particular target server 106, such as by requiring information about the user's authentication to the firewall or operating system target servers 106 before authenticating to a database target server 106. To accomplish this, the target server 106 may compare a previously stored authentication plan with information about the user's current authentications to determine if they match. If they do not match, the target server 106 may deny access as the user may be posing as an insider to skip multiple levels of authentication while if they do match, the user may be authenticated to the target server 106. Authentication plans may include one or more defined authentication steps that must be performed before a user is allowed to authenticate. An example authentication plan may require, say, that a user must first authenticate at server A before server B, which may be independent of server A, allows the user to authenticate, even if the credentials are otherwise perfect. An authentication plan may require as many steps as is needed or a user or target server 106 desires.

Users may utilize a user computer system 102 according to the present embodiments to facilitate gaining access to a target server 106 via authentication. User computer system 102 may be a personal computer system or other computer system adapted to execute computer programs, such as a personal computer, workstation, server, notebook or laptop computer, desktop computer, personal digital assistant (PDA), mobile phone, wireless device, or set-top box. A user may interact with the user computer system 102 via a user interface to, for example, request access to a target server 106 or to receive information about whether access was granted from the target server 106. User computer system 102 may be in communication with network 104 for transmitting and receiving information.

The user computer system 102 may include an authentication store manager 112 to facilitate cascading authentication. The authentication store manager 112, which will be described in more detail in relation to FIG. 4, may provide for interaction with target servers 106 and/or the authentication store 108. The authentication store manager 112 may, for example, store an authentication event record for each performed authentication step in the authentication store 108. The authentication store manager 112 may also interact with target servers 106, such as when a target server 106 grants or denies access, requests or establishes an authentication plan, or requests resolution of a discrepancy between an authentication plan and the user's current authentications. The authentication store manager 112 may thus serve as a trusted source of authorization information for authorization mechanisms of various target servers 106 that request such information.

Network 104 may be any type of data communications channel or combination of channels, such as the Internet, an intranet, a LAN, a WAN, an Ethernet network, a wireless network, telephone network, a proprietary network, or a broadband cable network. In one example, a LAN may be particularly useful as a network 104 between a user computer system 102 and target servers 106 in a corporate environment to facilitate communication within the organization, while in other examples network 104 may connect a user computer system 102 with a Web-based authentication store 108 with the Internet serving as network 104. Those skilled in the art will recognize, however, that the invention described herein may be implemented utilizing any type or combination of data communications channel(s) without departure from the scope and spirit of the invention.

As described previously, target servers 106 are software entities for which authentication may be required, and granted, in order to access resources of each target server 106. Target servers 106 may include a wide variety of software entities, including operating systems, databases, firewalls, virtual private networks (VPNs), networks, applications, or other entities. One or more target servers 106 may be implemented on server computer systems such as an International Business Machine Corporation (IBM) IBM Websphere® application server as well as any other type of computer system (such as described in relation to FIG. 2). As depicted in FIG. 1, the target servers 106 may be nested in layers so that access to an inner target server 106 first requires access to outer (in FIG. 1), lower level target servers 106. In the depicted embodiment, for example, access to the target server 106 at level 3 would also require access to the target servers 106 at levels 1 and 2.

Each target server 106 may include an authentication plan manager 110 to access a stored authentication plan associated with a user requesting access to the target server 106. The stored authentication plan may include one or more authentication records each having expected information relating to access by a user to a different target server 106 at a previous layer of authentication than the target server 106. The authentication plan manager 110 may provide a current authentication plan representing the user's current authentication situation from the authentication store manager 112 (which itself may access the current authentication plan from the authentication store 108). The authentication plan manager 110 may also determine whether to authenticate a user based on a comparison between the stored authentication plan and the current authentication plan. By comparing an expected stored authentication plan with a current authentication plan, the authentication plan manager 110 may ascertain whether a user has properly authenticated at lower levels of target server 106 and may deny access to such user even if their other credentials (such as passwords) are correct, providing improved security for the target server 106.

Some target servers 106, such as legacy systems, may not have an authentication plan manager 110 and thus do not ask for the relevant authentication plans, but the authentications from these target servers 106 may still be used by subsequent target servers 106 to enhance their security. The disclosed system is thus compatible with existing infrastructure as target servers 106 that have not implemented the disclosed system will not request authentication information and instead will perform authentication normally. As depicted in FIG. 1, some target servers 106 in one cascading authentication system 100 may have an authentication plan manager 110 (and thus have implemented the disclosed system) while others do not.

Authentication store 108 may include any type or combination of storage devices, including volatile or non-volatile storage such as hard drives, storage area networks, memory, fixed or removable storage, or other storage devices. The authentication store 108 in some embodiments may be an encrypted database of disparate local and remote authentication information that can be written to and read by a trusted source such as the authentication store manager 112 on behalf of any authorized authentication mechanism that requests it. The authentication store 108 may be located in a variety of positions with the cascading authentication system 100, such as being a stand-alone component (perhaps implemented by a trusted third party on a remote server or network of servers) or part of the user computer system 102 or authentication store manager 112.

Figure 2:
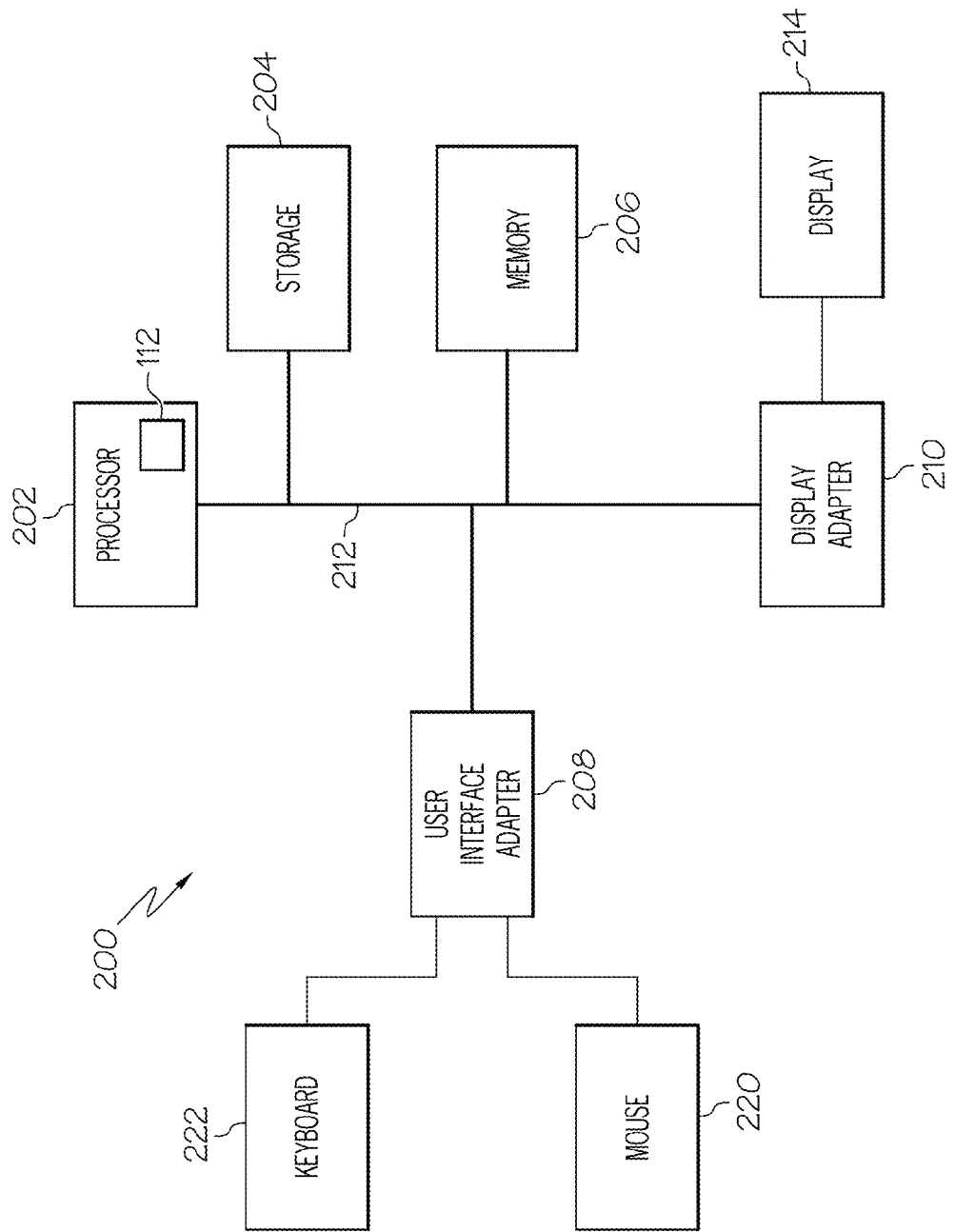
FIG. 2 depicts a block diagram of one embodiment of a computer system suitable for use as a component of the cascading authentication system.

FIG. 2 depicts a block diagram of one embodiment of a computer system 200 suitable for use as a component of the cascading authentication system. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200. Computer system 200 may be utilized to implement one or more target servers 106, a user computer system 102, and/or an authentication store 108.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the authentication store manager 112, such as by interacting with an authentication store 108, and may temporarily or permanently store information during its calculations or results after calculations in storage 204 or memory 206. All of part of the authentication store manager 112, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client 102 requesting access to a target server 106 or resolving an authentication plan conflict, for example, may utilize the keyboard 222 and mouse 220 to interact with the computer systems. The bus 212 may also connect the processor 202 to a display, such as an LCD display or CRT monitor, via the display adapter 210.

While the authentication store manager 112 is depicted as located in the processor 202 in FIG. 2 (such as a component of the BIOS), one of ordinary skill in the art will recognize that other alternatives are possible. In preferred embodiments, the authentication store manager 112 may execute in a location with a sufficient level of security so as to minimize the possibility of hacking. Because the authentication store manager 112 is trusted to provide accurate information from the authentication store 108, it may preferably be implemented by a trusted party with trusted encryption and also exchange private keys (or other suitable encryption method) with each target server 106 that is authenticated to prevent spoofing these records. The authentication store manager 112 may thus be implemented at low level in the hardware (BIOS) as depicted in FIG. 2, in an operating system (i.e., kernel), or by a third party such as VeriSign, Inc. or a corporate Lightweight Directory Access Protocol (LDAP) directory extension. Because of firewalls and other limited degrees of network visibility, proxy authentication store managers 112 may be required to bridge across networks to field requests.

Figure 3:
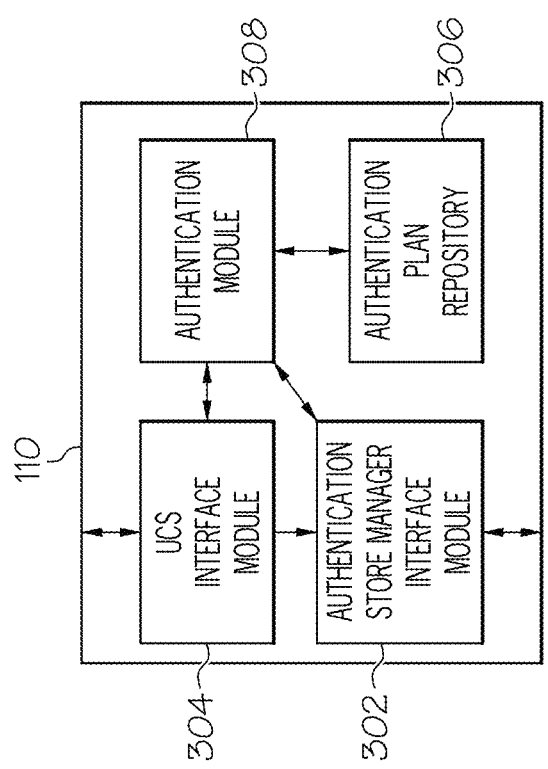
FIG. 3 depicts a conceptual illustration of software components of an authentication plan manager according to some embodiments.

FIG. 3 depicts a conceptual illustration of software components of an authentication plan manager 110 according to some embodiments. As described previously (and in more detail in relation to FIG. 7), the authentication plan manager 110 may authenticate a user based on a stored authentication plan and a user's current authentications as found in the authentication store 108. The authentication plan manager 110 may include an authentication store manager interface module 302, a user computer system interface module 304, an authentication plan repository 306, and an authentication module 308. The authentication store manager interface module 302 may provide for communication to and from the authentication store 108 via the authentication store manager 112, thus serving as an interface between the authentication store 108 and other components of the authentication plan manager 110. The user computer system interface module 304 may provide for communication to and from a user computer system, including receiving requests for access to the target server 106 and transmitting an indication of whether access was granted to the user. The functionality of the authentication store manager interface module 302 and the user computer system interface module 304 may be combined into one module in some embodiments, such as when the user computer system 102 includes the authentication store manager 112.

The authentication module 308 may provide a variety of functions to facilitate authentication of a user according to the present embodiments. The authentication module 308 may store and access authentication plans associated with a plurality of users in the authentication plan repository 306. The authentication module 308 may store an authentication plan when it is received from a user or when it is developed for a user (or in conjunction with a user), and may access a stored authentication plan in response to a user requesting access to the target server 106 implementing the authentication plan manager 110. After the user computer system interface module 304 receives an authentication request from a user, the authentication module 308 may access the stored authentication plan for that user from the authentication plan repository 306 and compare that plan to a current authentication plan (received by the authentication store manager interface module 302).

Figure 4:
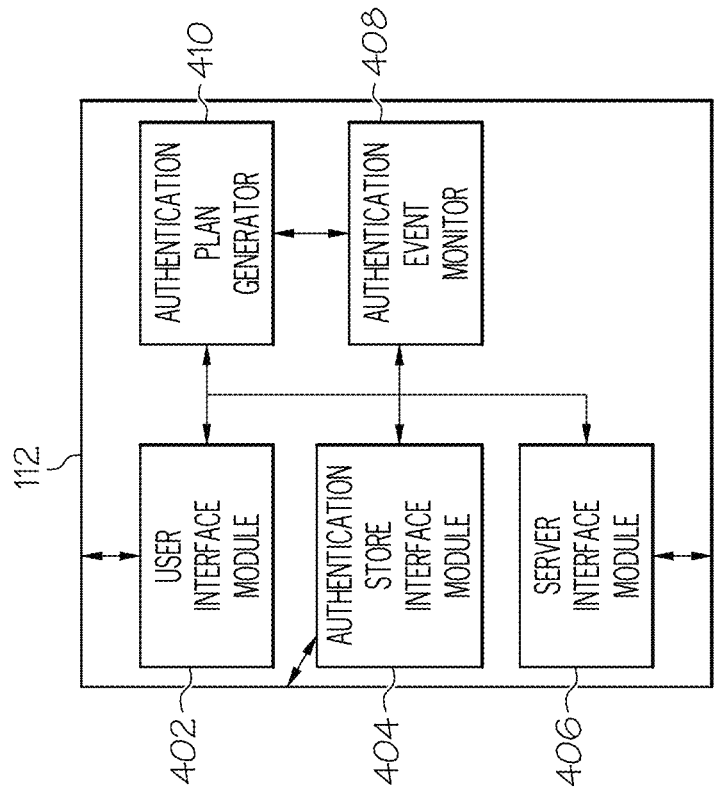
FIG. 4 depicts a conceptual illustration of software components of an authentication store manager according to some embodiments.

FIG. 4 depicts a conceptual illustration of software components of an authentication store manager 112 according to some embodiments. As described previously (and in more detail in relation to FIG. 6), the authentication store manager 112 may facilitate storing and managing authentication information relating to a user's authentication of a plurality of target servers 106 by managing the authentication store 108. The authentication store manager 112 may include a user interface module 402, an authentication store interface module 404, a server interface module 406, an authentication event monitor 408, and an authentication plan generator 410. The user interface module 402 may facilitate communication to and from a user, including receiving requests for access to a target server 106 and transmitting an indication that access was granted or denied, that an authentication plan needs to be created or modified, or other information. The authentication store interface module 404 may facilitate communication to and from the authentication store 108, including storing an indication of authentication events in the authentication store 108 and accessing authentication plans upon request of an authenticating entity such as a target server 106. The server interface module 406 may facilitate communication between a target server 106 (and its authentication plan manager 110) and the authentication store manager 112. The three interface modules 402, 404, and 406 may each provide communication between components of the authentication store manager 112 and outside entities, and their functionality may be combined or divided in any fashion.

The authentication event monitor 408 may monitor a user's performed authentication steps (e.g., entering a password, using a smart card, etc.) and may store an encrypted indication of such steps in the authentication store 108 (via the authentication store interface module 404). In some embodiments, the authentication event monitor 408 may at every authentication step create an encrypted event record for storage in the authentication store 108 with information that subsequent layers of authentication may request. The information in the authentication record may include one or more of a unique record identifier for internal management use, one or more target server 106 identifiers (such as MAC address, server type, server identifier, server group, IP address, etc.), one or more user identifiers (such as a user name, group name, etc.), one or more authentication event facts (such as the number of failed authentication attempts prior to successful login, timestamp local to the authentication store 108, etc.,) or other information.

The authentication plan generator 410 may facilitate creation and maintenance of an authentication plan for a user. A user may create a plan if required or allowed by a target server 106, such as by identifying current records in their authentication store that should be used in the authentication plan for the particular target server 106. In some embodiments, an administrator of the target server 106 may have pre-established the required authentication steps required in any authentication plan. A server administrator could require, for example, that the authentication plan include at least server types BIOS, OS, VPN, and FIREWALL, and perhaps further pre-known information such as a specific VPN server group or firewall IP address. A user may also request additional steps be included beyond those required by a target server 106 for the user's protection.

Figure 5:
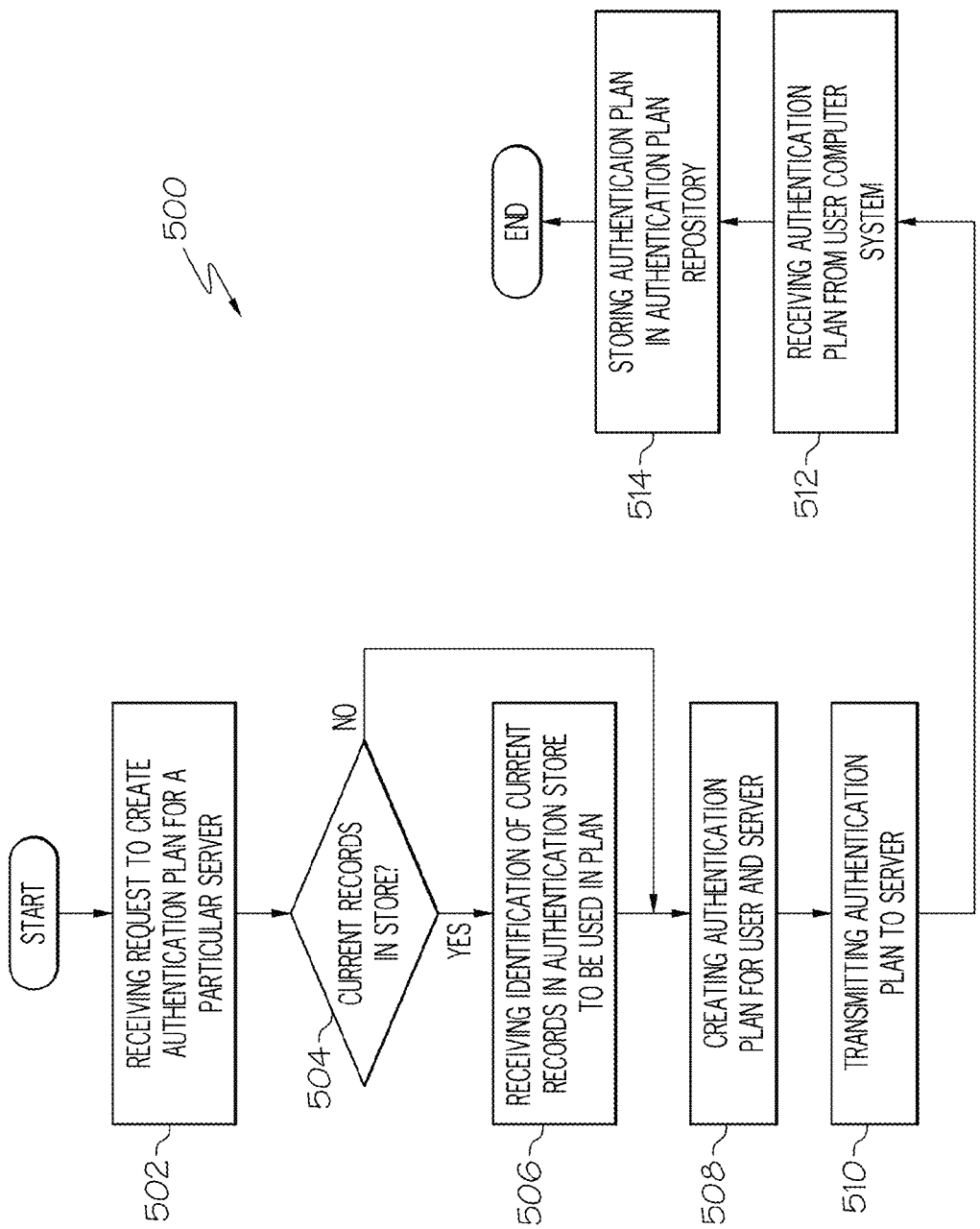
FIG. 5 depicts an example of a flow chart for creating an authentication plan for a particular user and target server according to some embodiments.

FIG. 5 depicts an example of a flow chart 500 for creating an authentication plan for a particular user and target server according to some embodiments. The method of flow chart 500 may be performed, in one embodiment, by components of the cascading authentication system 100 such as the authentication plan manager 110 and the authentication store manager 112. Flow chart 500 begins with element 502, receiving a request to create an authentication plan for a particular server. The request for an authentication plan may be received from a target server 106 attempting to inform a user that an authentication plan is required or it may be received from a user requesting to establish an authentication plan with a particular target server 106.

At decision block 504, the authentication store manager 112 may determine whether any authentication records current exist for the particular user and other levels of authentication. If so, the authentication store manager 112 may present the current list of existing authentication records (from the authentication store 108) to the user so that the user may select which authentication events they would like to include in the authentication plan for the target server 106. The authentication store manager 112 may receive an identification of the current records in the authentication store 108 that will be used in the authentication plan at element 506. The target server 108 may also require particular authentication events from the user in addition to those chosen by the user. At element 508, the authentication plan generator 410 of the authentication store manager 112 may create the authentication plan based on the preferences and selections of the user and the target server 106.

After the authentication plan has been created, the server interface module 406 of the authentication store manager 112 may then transmit the plan to the target server 106 at element 510. At element 512, the target server 106 may receive the authentication plan and store the plan in the authentication plan repository 306 at element 514, after which the method terminates. The authentication plan repository 306 may serve as storage for a variety of authentication plans for many users in some embodiments.

Figure 6:
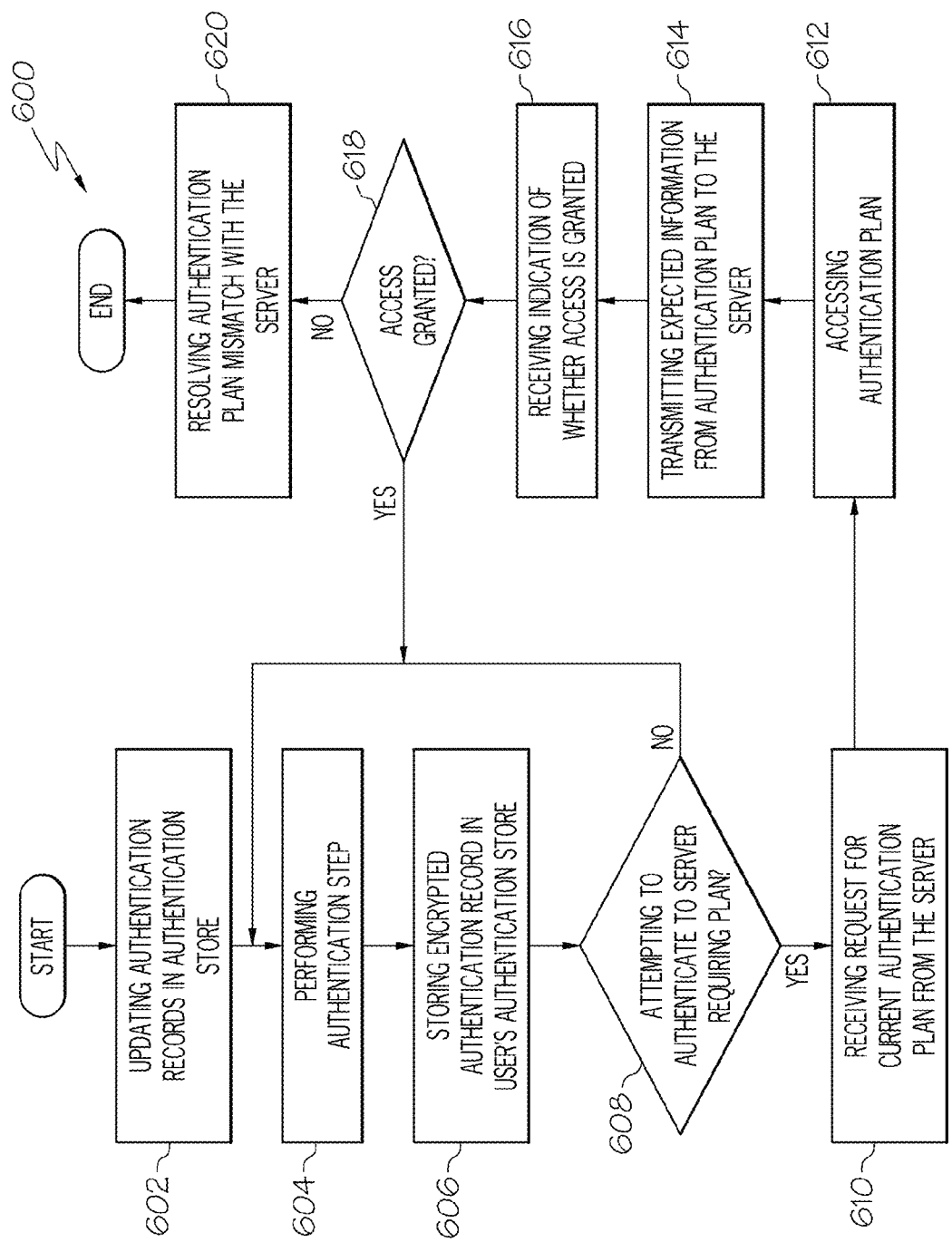
FIG. 6 depicts an example of a flow chart for authenticating to a target server by a user according to some embodiments.

FIG. 6 depicts an example of a flow chart 600 for authenticating to a target server by a user according to some embodiments. The method of flow chart 600 may be performed, in one embodiment, by components of the cascading authentication system 100 such as the authentication store manager 112. Flow chart 600 begins with optional element 602, updating authentication records in the authentication store 108. The authentication store manager 112 may update the authentication records for a variety of reasons. In some embodiments, for example, the authentication store manager 112 may attempt to avoid stale information by deleting the authentication record whenever a target server 106 that has been authenticated is logged our disconnected or whenever a target server 106 earlier in the authentication plan is similarly logged out or disconnected. In these embodiments, the authentication record may first be written to another table for archival purposes such as reporting or usage analysis. The authentication store manager 112 may accomplish this by periodically querying the target server's authentication system for a current status, receiving requests to delete records from the target server 106, and/or receiving such requests from the user. The authentication store manager 112 may also perform the reverse methodology by logging out downstream target servers 106 in the event a target server 106 higher in the authentication plan is logged out or in the event such a server revokes or suspends the user.

The user computer system 102 may perform authentication steps for different target servers 106 at element 604, such as by successfully authenticating to a target server 106 such as the machine hardware (with a power on password), their operating system, VPN, firewall, database, etc. At element 606, the authentication store manager 112 may store an encrypted authentication record in the user's authentication store 108, as described previously. The authentication record may include information about performance of the authentication step, such as indication of its success, a timestamp, an indication of how many attempts were required, etc. The user computer system 102 may then attempt to authenticate to a target server 106 at decision block 608. If such target server 106 does not require an authentication plan, the method may return to element 604 for performing the authentication step and storing an authentication record based on the performed step.

If the target server 106 does require an authentication plan, the authentication store manager 112 may receive a request for the current authentication plan from the target server 106 at element 610. As described previously, the current authentication plan may include an authentication record for one or more authentication steps for servers at previous layers of authentication to the target server 106. The authentication records included in the current authentication plan are thus the expected authentication records for the user (i.e., what the target server 106 expects the user to have done). The authentication plan manager 112 may then at element 612 access the authentication plan for the user and may then transmit the expected information from the authentication plan to the target server 106 at element 614.

After the information from the authentication plan has been transmitted, the user computer system 102 and its authentication store manager 112 may receive at element 616 an indication of whether access was granted by the target server 106. If access was granted at decision block 618, the method of flow chart 600 either terminates (and the user performs whatever task they were seeking access to accomplish) or returns to element 604 for performing an authentication step at element 604. If access was not granted at decision block 618, the authentication store manager 112 may be notified that they are accessing via an unauthorized authentication plan. If the authentication plan needs to be changed, the method continues to element 620 where the authentication store manager 112 may resolve any authentication plan mismatch with the target server 106, after which the method terminates. If the authentication plan needs to be changed, that will typically require administrator intervention in coordination with the user, which may be implemented in any fashion, such as by requiring extra authentication such as via a secret passphrase, a smartcard, or other authentication method. This helps prevent someone spoofing the user to request the authentication plan be changed to something easier for the spoofer (or hacker) or as a denial of service attack.

Figure 7:
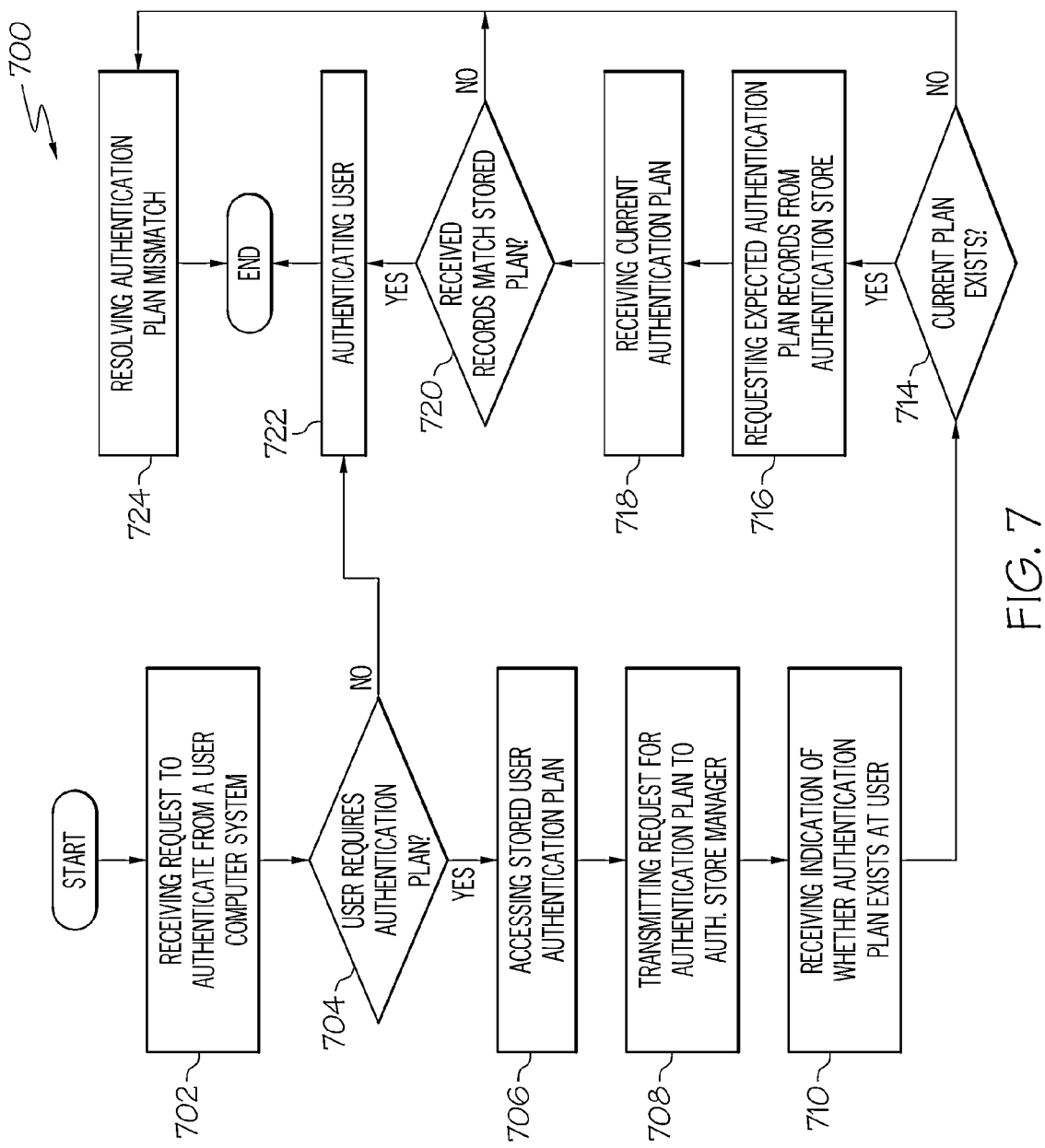
FIG. 7 depicts an example of a flow chart for authenticating a user by a target server to some embodiments.

FIG. 7 depicts an example of a flow chart 700 for authenticating a user by a target server to some embodiments. The method of flow chart 700 may be performed, in one embodiment, by components of the cascading authentication system 100 such as the authentication plan manager 110 of a target server 106. Flow chart 700 begins with element 602, receiving a request from a user computer system 102 for the user to authenticate to the target server 106. At decision block 704, the authentication plan manager 110 may determine whether the particular user desiring to authenticate to the target server 106 requires matching an established authentication plan. If no authentication plan is required, the method may advance to element 722, where the user is authenticated in a standard fashion (i.e., verifying their authentication credentials), after which the method terminates. If an authentication plan is required, the method continues to element 706.

At element 706, the authentication module 308 of the authentication plan manager 110 may access the stored authentication plan for the user that is stored in the authentication plan repository 306. The user computer system interface module 304 may transmit at element 708 a request for an authentication plan to the authentication store manager 112. The authentication plan manager 110 may receive an indication from the authentication store manager 112 at element 710 of whether a current authentication plan exists in the authentication store 108. If a current plan does not exist at decision block 714, the method continues to element 724, where the authentication module 308 denies access to the target server 106 and attempts to resolve any authentication plan mismatch with the authentication store manager 112. For example, if the attempt is the user's first attempt to authenticate to the target server 106 (or after a reset), an authentication plan create method may be invoked to work with the user to develop an authentication plan for the target server 106. Alternatively, as described previously, the user may be requested to provide additional authentication credentials, such as a passphrase, in order to authenticate.

If a current authentication plan does exist at decision block 714, the authentication plan manager 110 may at element 716 request the authentication records relevant to the stored authentication plan from the authentication store 108 via the authentication store manager 112. At element 718, the authentication plan manager 110 may receive the current authentication plan (or the subset of authentication records of the current authentication plan that is required to match the stored authentication plan).

The authentication module 308 may at decision block 720 compare the stored authentication plan with the received current authentication plan to determine if they match sufficiently for the user to be allowed access. In some embodiments, the authentication module 308 may require an exact match between the stored authentication plan and the current authentication plan in order to allow access. In other embodiments, the authentication module 308 may make a more sophisticated analysis, such as by analyzing the timestamps of authentication events in the current authentication plans (and rejecting those that are too long ago in time), analyzing the matter of authentication for previous authentication events (e.g., rejecting those that show a suspicious pattern, such as too many attempts before authentication), or other types of analysis.

If the authentication module 308 determines at decision block 720 that a match exists, the method continues to element 722 where the user may be authenticated in a standard fashion (such as by requiring particular authentication credentials), after which the method terminates. If no match exists, the method of flow chart 700 continues to element 724 for resolving an authentication plan mismatch, as described previously, after which the method may terminate. The method of flow chart 700 may thus provide for improved authentication of a user to a target server 106 by comparing the user's current authentications to a previously established authentication plan and requiring a sufficient match to allow the user to authenticate in the standard manner.

It will be apparent to those skilled in the art having the benefit of this disclosure that the present invention contemplates methods, systems, and media for authenticating users to a server based on previous authentications to other servers by the user. It is understood that the form of the invention shown and described in the detailed description and the drawings are to be taken merely as examples. It is intended that the following claims be interpreted broadly to embrace all the variations of the example embodiments disclosed.

What is claimed is:

1. A method for authenticating a user to a target server, the method comprising:

receiving, by a computer system having at least one processor coupled to memory, a request from a user computer system to authenticate the user for access to a target server at level N of N levels, wherein N is a positive integer of at least 2, wherein N target servers are sequentially nested at respective levels of the N levels denoted as levels 1 through N sequenced from lowest level to highest level, and wherein authentication of the user for access to the target server at level N requires prior authentication of the user for access to the target server at level 1 if N is 2 or for access to the N−1 target servers at the respective levels 1 through N−1 if N is at least 3;

accessing, by the computer system, a stored authentication plan associated with the user, the stored authentication plan having one or more authentication records each having expected information relating to authentication of the user for access to the N−1 target servers at the respective levels 1 through N−1;

receiving, by the computer system, an indication of whether a current authentication plan exists in an authentication store, the current authentication plan having one or more authentication records, each authentication record having current information relating to authentication of the user for access to the N−1 target servers at the respective levels 1 through N−1;

in response to having received a determination that the current authentication plan exists, (i) requesting, by the computer system, the current authentication plan and (ii) receiving, by the computer system, the current authentication plan from the authentication store;

determining, by the computer system, that there is at least a partial match between the stored authentication plan and the current authentication plan; and authenticating in response to said determining that there is at least the partial match, by the computer system, the user for access to the target server at level N.

2. The method of claim 1, wherein said determining that there is at least the partial match comprises determining that there is at least the partial match based on analyzing authentication events.

3. The method of claim 1, wherein the method further comprises:

determining, by the computer system, that there is a mismatch between the stored authentication plan and the current authentication plan; and resolving, by the computer system, the mismatch.

4. The method of claim 3, wherein said resolving the mismatch comprises requiring additional authentication information.

5. The method of claim 3, wherein said resolving the mismatch comprises invoking a process to modify or create a new authentication plan.

6. The method of claim 1, wherein each of the one or more authentication records of the authentication plan and the current authentication plan comprise a server identifier and an authentication event fact.

7. The method of claim 1, wherein the at least the partial match is an exact match.

8. The method of claim 1, wherein N is at least 3.

9. A computer program product for authenticating a user to a target server, said computer program product comprising: one or more computer readable storage devices and program instructions stored on the one or more storage devices, wherein the program instructions stored on the one or more storage devices comprise:

program instructions to receive a request from a user computer system to authenticate the user for access to a target server at level N of N levels, wherein N is a positive integer of at least 2, wherein N target servers are sequentially nested at respective levels of the N levels denoted as levels 1 through N sequenced from lowest level to highest level, and wherein authentication of the user for access to the target server at level N requires prior authentication of the user for access to the target server at level 1 if N is 2 or for access to the N−1 target servers at the respective levels 1 through N−1 if N is at least 3;

program instructions to access a stored authentication plan associated with the user, the stored authentication plan having one or more authentication records each having expected information relating to authentication of the user for access to the N−1 target servers at the respective levels 1 through N−1;
program instructions to receive an indication of whether a current authentication plan exists in an authentication store, the current authentication plan having one or more authentication records, each authentication record having current information relating to authentication of the user for access to the N−1 target servers at the respective levels 1 through N−1;
program instructions to, in response to having received a determination that the current authentication plan exists, (i) request the current authentication plan and (ii) receive the current authentication plan from the authentication store;
program instructions to determine that there is at least a partial match between the stored authentication plan and the current authentication plan; and
program instructions to authenticate in response to a determination that there is at least the partial match, the user for access to the target server at level N.

10. The computer program product of claim 9, wherein the program instructions to determine that there is at least the partial match comprises program instructions to determine that there is at least the partial based on analyzing authentication events.

11. The computer program product of claim 9, wherein the program instructions stored on the one or more storage devices comprise:
program instructions to determine that there is a mismatch between the stored authentication plan and the current authentication plan; and
program instructions to resolve the mismatch.

12. The computer program product of claim 11, wherein the program instructions to resolve the mismatch comprises program instructions to require additional authentication information.

13. The computer program product of claim 11, wherein the program instructions to resolve the mismatch comprises program instructions to modify or create a new authentication plan.

14. The computer program product of claim 9, wherein each of the one or more authentication records of the authentication plan and the current authentication plan comprise a server identifier and an authentication event fact.

15. A computer system for authenticating a user to a target server, said computer system comprising: one or more processors, one or more computer readable storage devices, program instructions stored on the one or more storage devices, and one or more memories, wherein the program instructions stored on the one or more storage devices are configured to be executed by the one or more processors via the one or more memories, wherein the program instructions stored on the one or more storage devices comprise:
program instructions to receive a request from a user computer system to authenticate the user for access to a target server at level N of N levels, wherein N is a positive integer of at least 2, wherein N target servers are sequentially nested at respective levels of the N levels denoted as levels 1 through N sequenced from lowest level to highest level, and wherein authentication of the user for access to the target server at level N requires prior authentication of the user for access to the target server at level 1 if N is 2 or for access to the N−1 target servers at the respective levels 1 through N−1 if N is at least 3;
program instructions to access a stored authentication plan associated with the user, the stored authentication plan having one or more authentication records each having expected information relating to authentication of the user for access to the N−1 target servers at the respective levels 1 through N−1;
program instructions to receive an indication of whether a current authentication plan exists in an authentication store, the current authentication plan having one or more authentication records, each authentication record having current information relating to authentication of the user for access to the N−1 target servers at the respective levels 1 through N−1;
program instructions to, in response to having received a determination that the current authentication plan exists, (i) request the current authentication plan and (ii) receive the current authentication plan from the authentication store;
program instructions to determine that there is at least a partial match between the stored authentication plan and the current authentication plan; and
program instructions to authenticate in response to a determination that there is at least the partial match, the user for access to the target server at level N.

16. The computer system of claim 15, wherein the program instructions to determine that there is at least the partial match comprises program instructions to determine that there is at least the partial based on analyzing authentication events.

17. The computer system of claim 15, wherein the program instructions stored on the one or more storage devices comprise:
program instructions to determine that there is a mismatch between the stored authentication plan and the current authentication plan; and
program instructions to resolve the mismatch.

18. The computer system of claim 17, wherein the program instructions to resolve the mismatch comprises program instructions to require additional authentication information.

19. The computer system of claim 17, wherein the program instructions to resolve the mismatch comprises program instructions to modify or create a new authentication plan.

20. The computer system of claim 15, wherein each of the one or more authentication records of the authentication plan and the current authentication plan comprise a server identifier and an authentication event fact.

* * * * *